US007183897B2

(12) United States Patent
Tang et al.

(10) Patent No.: US 7,183,897 B2
(45) Date of Patent: Feb. 27, 2007

(54) KEY FOB DEACTIVATION SYSTEM AND METHOD

(75) Inventors: Qingfeng Tang, Novi, MI (US); Yi Luo, Ypsilanti, MI (US)

(73) Assignee: Lear Corporation, Southfield, MI (US)

( * ) Notice: Subject to any disclaimer, the term of this patent is extended or adjusted under 35 U.S.C. 154(b) by 337 days.

(21) Appl. No.: 10/993,384

(22) Filed: Nov. 19, 2004

(65) Prior Publication Data

US 2006/0109080 A1 May 25, 2006

(51) Int. Cl.
*G08B 5/22* (2006.01)
*G08C 19/00* (2006.01)
*H04Q 9/00* (2006.01)
*H04L 17/02* (2006.01)

(52) U.S. Cl. ................................ 340/5.72; 340/825.36; 340/825.69; 341/176

(58) Field of Classification Search ............... 340/5.72, 340/825.36, 825.69; 341/176
See application file for complete search history.

(56) References Cited

U.S. PATENT DOCUMENTS

| | | | | |
|---|---|---|---|---|
| 4,977,404 | A * | 12/1990 | Durst et al. | 341/176 |
| 5,541,571 | A | 7/1996 | Ochs et al. | |
| 2004/0183671 | A1 | 9/2004 | Long | |

FOREIGN PATENT DOCUMENTS

| | | |
|---|---|---|
| WO | WO 97/19431 | 5/1997 |

* cited by examiner

*Primary Examiner*—Jeffery Hofsass
*Assistant Examiner*—Scott Au
(74) *Attorney, Agent, or Firm*—MacMillan, Sobanski & Todd, LLC

(57) ABSTRACT

A remote keyless entry system includes a key fob having a tilt sensor. The tilt sensor detects when the key fob is tilted out of a range of preferred orientation and cooperates with the fob controller to selectively deactivate one or more of the remote keyless entry function buttons on the key fob.

20 Claims, 2 Drawing Sheets

KEY FOB DEACTIVATION SYSTEM AND METHOD

BACKGROUND OF INVENTION

The present invention relates to remote keyless entry systems for vehicles, and in particular to selective deactivation of functions on a key fob of a remote keyless entry system.

Remote keyless entry (RKE) systems for vehicles enjoy wide use today, with RKE systems adding additional functions over and above the more conventional lock/unlock, trunk release and alarm functions. Such functions may include, for example, power door open/close and remote engine start. Typically, the conventional key fob transmits a vehicle function request whenever a button is pressed, whether inadvertent or not. For some, a RKE function being performed when a button is inadvertently pressed is a significant annoyance. For example, when a key fob is in ones pocket or purse, an alarm or trunk release button may be inadvertently pressed, causing the key fob to transmit the requested vehicle function even if not desired by the one carrying the key fob. One may then have to pull out the key fob and press the button again or go over to the vehicle to counteract the inadvertent vehicle function performed.

Thus, it is desirable to provide a means for deactivating a key fob when it is likely that a press of a button thereon is inadvertent.

SUMMARY OF INVENTION

In its embodiments, the present invention contemplates a key fob for use in a remote keyless entry system of a vehicle. The key fob may include a power source, a user operable button indicative of a remote keyless entry function associated with the vehicle, a tilt sensor capable of detecting a tilt angle of the key fob relative to horizontal, and a transmitter operable to transmit a signal indicative of the remote keyless entry function. The key fob may also include a fob controller operatively engaging the power source, the user operable button, the transmitter, and the tilt sensor, with the controller operative to prevent transmission of the signal indicative of the remote keyless entry function when the tilt sensor detects that the tilt angle is not within a predetermined acceptable range of angles from the horizontal.

The present invention also contemplates a method of operating a key fob adapted to be employed in a remote keyless entry system of a vehicle. The method may comprise the steps of: detecting an actuation of a user operable button on the key fob; detecting the tilt angle of the key fob; determining if the detected tilt angle is within a predetermined range from horizontal; and transmitting a signal indicative of a remote keyless entry function associated with the user operable button if the detected tilt angle is within the predetermined range from the horizontal when the actuation of the user operable button is detected.

An advantage of an embodiment of the present invention is that the key fob is deactivated when it is not within a range around a preferred orientation. Thus, when the key fob is in a pocket or a purse, where it is likely not within the range of the preferred orientation, it will be deactivated. Thus, an inadvertently pressed button on the key fob will not cause the function to be performed on the vehicle.

A further advantage of an embodiment of the present invention is that the deactivation may be applied selectively to only certain functions where an inadvertent button press is a concern.

An additional advantage of an embodiment of the present invention is that the orientation based button deactivation may be disabled for those who wish to be able to activate RKE functions no matter what the key fob orientation. Thus, the key fob may be active even while the key fob is still in ones pocket or purse.

DETAILED DESCRIPTION

Figure 1:
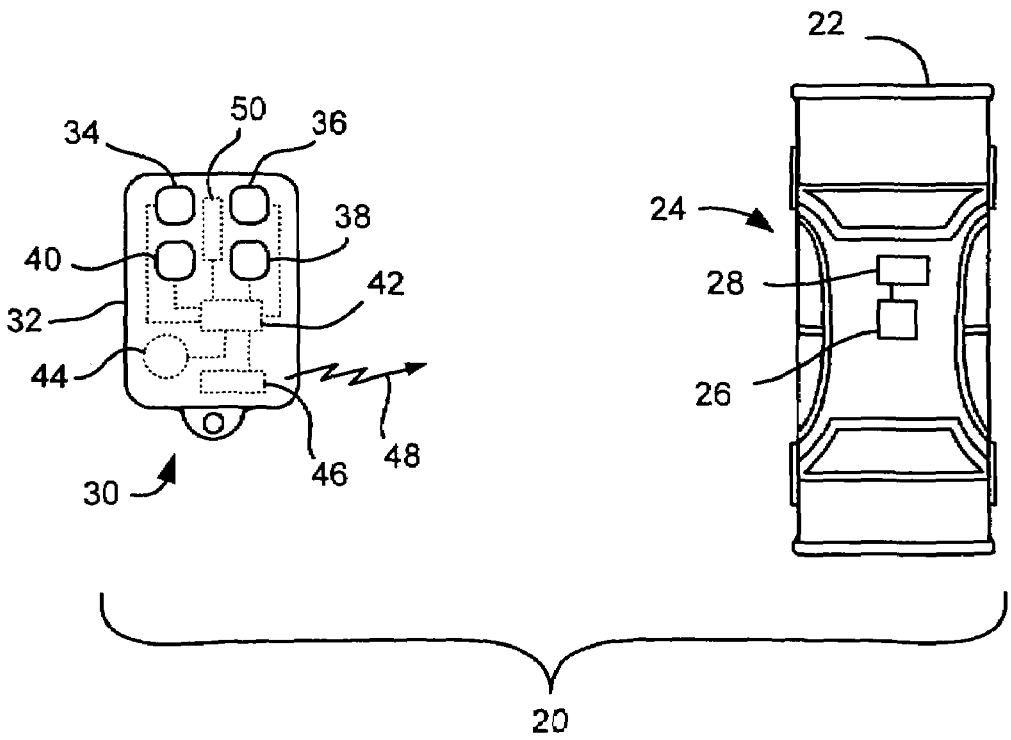
FIG. 1 is a schematic diagram of a vehicle with a RKE system in accordance with an embodiment of the present invention.
Figure 2:
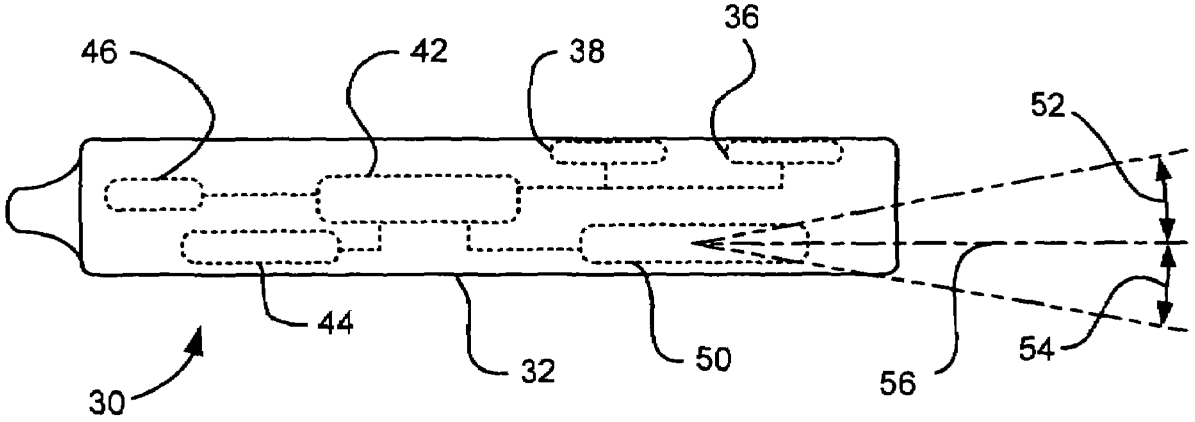
FIG. 2 is a schematic diagram of a key fob and exemplary deactivation tilt angles in accordance with an embodiment of the present invention.

FIGS. 1–2 illustrate a remote keyless entry (RKE) system, indicated generally at 20, employed with a vehicle 22. The base or vehicle mounted portion 24 of the RKE system 20 includes a receiver 26 and a controller 28, which may be comprised of various combinations of hardware and software, as is known to those skilled in the art. The receiver 26 may be separate from or integral with the controller 28 and may be a transceiver if the RKE system 20 includes two-way communication. The controller 28 may be in communication with systems that carry out the desired RKE functions, such as a door lock/unlock actuator (not shown), a vehicle horn and headlights (not shown), an engine ignition system (not shown), and/or a trunk release mechanism (not shown). These systems will not be described in any detail since they are known to those skilled in the art.

The RKE system 20 also includes a key fob 30 having a housing 32 with exposed buttons. These vehicle function buttons may include, for example, door lock 34, door unlock 36, trunk release 38, and alarm 40 buttons. The key fob 30 also includes a fob controller 42, powered by a battery 44, a transmitter 46, capable of transmitting a radio frequency (RF) signal 48 that can be received by the receiver 26, and a tilt sensor 50. The fob controller 42 is in communication with the transmitter 46, tilt sensor 50 and the vehicle function buttons 34, 36, 38, 40. The details of the fob controller 42, transmitter 46 and other electronic circuitry of the key fob 30 will not be discussed in detail herein since they are known to those skilled in the art. The transmitter 46 may be a transceiver if the RKE system 20 includes two-way communication, and may transmit the signal by wireless means other than by RF transmission, if so desired. Also, while the components in the key fob 30 are schematically illustrated as discrete components, they may be integrated, and/or may be mounted on a printed circuit board, if so desired.

The tilt sensor 50 is employed to detect the orientation of the fob 30 relative to a horizontal plane 56, (i.e., perpendicular to the direction of gravity). The tilt sensor 50 may be any one of different types of conventional gravity based sensors that can react to the angle the fob 30 is tilted from horizontal. For example, the tilt sensor 50 may employ a mercury switch. Moreover, the switch may detect actual upward tilting angle 52 and downward tilting angle 54, or may just detect whether the tilt sensor 50 is inside or outside of the desired range from the preferred horizontal orientation. The upward and downward tilt angles 52, 54 that form the range preferred orientation may be, for example, ten degrees each. Of course, different angles of inclination for deactivation may be employed instead, if so desired. While the key fob 30 is shown in FIG. 2 with its back side facing down, the tilt sensor 50 may also be applied with the key fob 50 tilted on its side.

Figure 3:
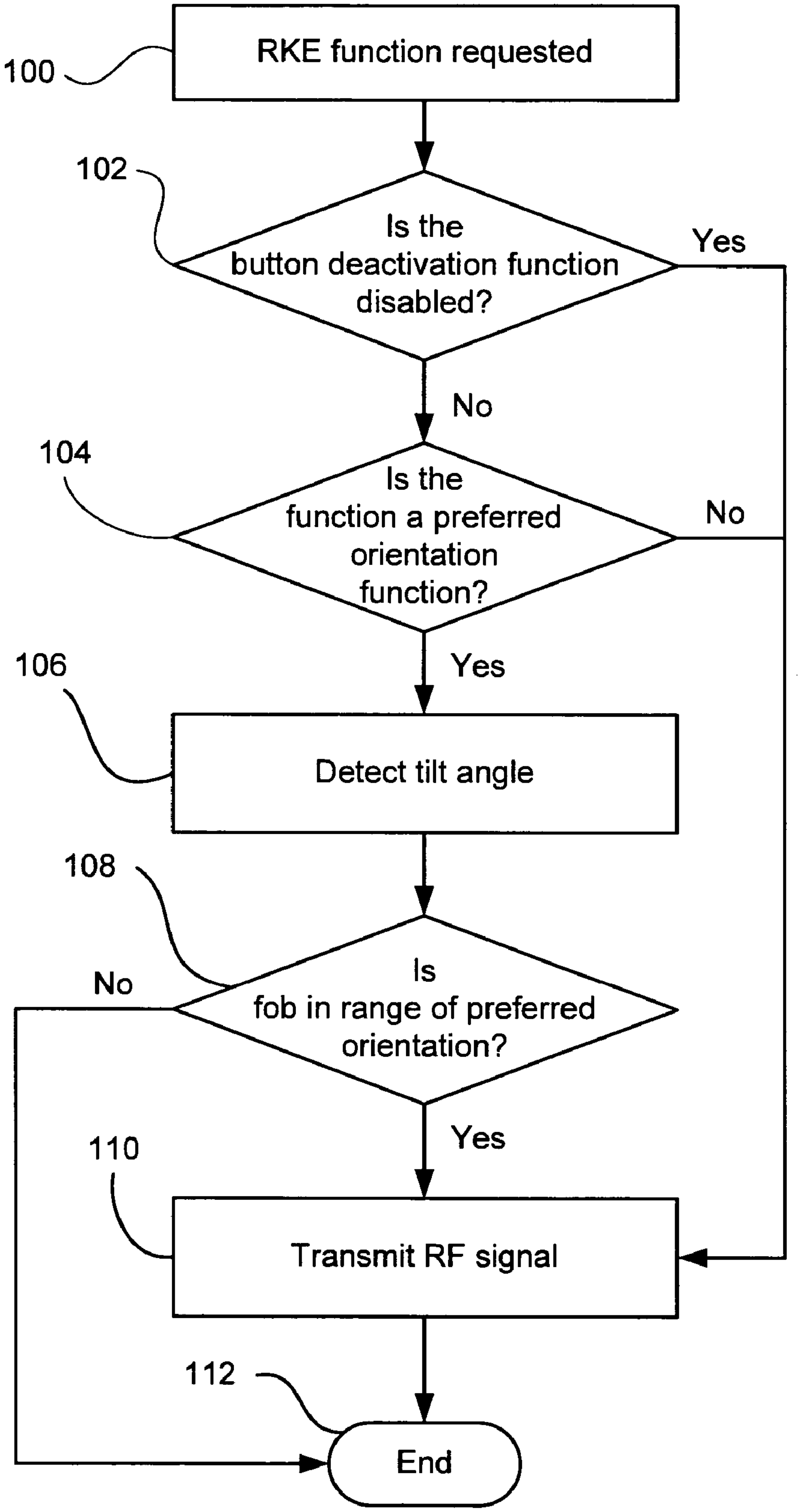
FIG. 3 is a flow chart of a method applicable to the fob controller of FIGS. 1 and 2, in accordance with an embodiment of the present invention.

FIG. 3 is a flowchart of a method applicable to the fob controller 42 in the key fob 30 of FIGS. 1 and 2. A RKE function is requested, block 100, which occurs when one of the buttons 34, 36, 38, 40 is pressed. A determination is made by the fob controller 42 as to whether the button deactivation function is disabled, block 102. The key fob 30 may be set up so that by pushing the buttons on the key fob 30 in a certain sequence, the tilt deactivation function will be enabled or disabled. In this way, for those who wish to be able to operate the key fob buttons—no matter what the tilt angle of the key fob 30—they may do so by disabling the button deactivation function. This disabling of the tilt angle function may be particularly advantageous for those who wish to activate RKE functions while the key fob 30 is still in ones pocket or purse. The decision step 102 is optional, so this function may be left out of the fob controller 42, if so desired.

If the button deactivation function is disabled, then the fob controller 42 will actuate the transmitter 46 to transmit a RF signal, block 110, requesting the RKE function corresponding to the button that was pressed regardless of the tilt angle. The routine then ends, block 112. If the button deactivation function is not disabled, then a determination is made whether the RKE function requested is one of the preferred orientation functions, block 104. That is, the fob controller 42 may be configured so that only certain RKE functions will be deactivated based on the tilt angle while others stay activated no matter what the tilt angle. This selective use of the tilt based disabling may be advantageous if users are typically annoyed only when certain RKE functions are performed if buttons are inadvertently pressed while in a purse or pocket. For example, one may apply the tilt angle deactivation only to the trunk release and alarm RKE functions, while allowing the door lock RKE function to remain active no matter what the tilt angle. The decision step 104 is optional and may be left out of the fob controller 42, if so desired.

If the button pressed is for a RKE function that is not a preferred orientation function, then the fob controller 42 will actuate the transmitter 46 to transmit a RF signal, block 110, requesting the RKE function corresponding to the button that was pressed regardless of the tilt angle. The routine then ends, block 112. If the button pressed is for a RKE function that is a preferred orientation function, then the tilt angle is detected, block 106. Again, this may be detection of an actual angle, or just a detection if the fob 30 is generally within the range of plus or minus angles 52, 54 from horizontal 56.

A determination is then made whether the tilt of the tilt sensor 50, and hence the fob 30, is within the range of preferred orientation, block 108. If the tilt is within the range, then the fob controller 42 will actuate the transmitter 46 to transmit a RF signal, block 110, requesting the RKE function corresponding to the button that was pressed. The routine then ends, block 112. If not, the routine ends, block 112, without performing any RKE function.

An alternative embodiment of the invention, although not necessarily as desirable as the first embodiment, may include the tilt sensor being located between the battery and the fob controller, with the tilt sensor blocking power to the fob controller when the fob is not within the range of preferred orientation. In this embodiment, then, the tilt sensor acts like a simple on-off power switch.

While certain embodiments of the present invention have been described in detail, those familiar with the art to which this invention relates will recognize various alternative designs and embodiments for practicing the invention as defined by the following claims.

What is claimed is:

1. A key fob for use in a remote keyless entry system of a vehicle, the key fob comprising:

a power source;

a user operable button indicative of a remote keyless entry function associated with the vehicle;

a tilt sensor capable of detecting a tilt angle of the key fob relative to horizontal;

a transmitter operable to transmit a signal indicative of the remote keyless entry function; and a fob controller operatively engaging the power source, the user operable button, the transmitter, and the tilt sensor, with the controller operative to prevent transmission of the signal indicative of the remote keyless entry function when the tilt sensor detects that the tilt angle is not within a predetermined acceptable range of angles from the horizontal.

2. The key fob of claim 1 further including a second user operable button indicative of a second remote keyless function associated with the vehicle and operatively engaging the fob controller, wherein the fob controller is operative to cause the transmitter to transmit a second signal indicative of the second remote keyless entry function without regard to the tilt angle detected by the tilt sensor.

3. The key fob of claim 2 wherein the remote keyless entry function associated with the user operable button is one of a trunk release function and an alarm function, and the second remote keyless entry function associated with the second user operable button is one of a door lock function and a door unlock function.

4. The key fob of claim 1 wherein the predetermined acceptable range is about plus or minus ten degrees from the horizontal.

5. The key fob of claim 1 wherein the transmitter is a transceiver.

6. The key fob of claim 1 wherein the fob controller is operative to selectively disable a tilt sensor function and transmit the signal indicative of the remote keyless entry function regardless of the tilt angle detected by the tilt sensor.

7. The key fob of claim 1 wherein the tilt sensor is a mercury switch.

8. A method of operating a key fob adapted to be employed in a remote keyless entry system of a vehicle, the method comprising the steps of:

(a) detecting an actuation of a user operable button on the key fob;

(b) detecting the tilt angle of the key fob;

(c) determining if the detected tilt angle is within a predetermined range from horizontal; and (d) transmitting a signal indicative of a remote keyless entry function associated with the user operable button if the detected tilt angle is within the predetermined range from the horizontal when the actuation of the user operable button is detected.

9. The method of claim 8 further including the steps of:

(e) selectively disabling a tilt angle function; and (f) transmitting a signal indicative of a remote keyless entry function associated with the user operable button if the tilt angle function is disabled when the actuation of the user operable button is detected.

10. The method of claim 9 further including the steps of:

(g) determining if the remote keyless entry function of the user operable button is a preferred orientation function; and (h) transmitting the signal indicative of the remote keyless entry function if the remote keyless entry function is not a preferred orientation function regardless of the detected tilt angle.

11. The method of claim 8 further including the steps of:

(g) determining the function of the user operable button;

(h) determining if the remote keyless entry function of the user operable button is a preferred orientation function; and (i) transmitting the signal indicative of the remote keyless entry function if the remote keyless entry function is not a preferred orientation function regardless of the detected tilt angle.

12. The method of claim 8 wherein step (d) is further defined by the remote keyless entry function associated with the user operable button being an alarm function.

13. The method of claim 8 wherein step (d) is further defined by the remote keyless entry function associated with the user operable button being a door lock function.

14. The method of claim 8 wherein step (d) is further defined by the remote keyless entry function associated with the user operable button being a door unlock function.

15. The method of claim 8 wherein step (d) is further defined by the remote keyless entry function associated with the user operable button being a trunk release function.

16. The method of claim 8 wherein step (d) is further defined by the signal transmission being a radio frequency transmission.

17. The method of claim 8 wherein step (c) is further defined by preventing power flow from a battery to a fob controller if the detected tilt angle is not within the predetermined range from horizontal.

18. A method of operating a key fob adapted to be employed in a remote keyless entry system of a vehicle, the method comprising the steps of:

(a) detecting an actuation of a user operable button on the key fob;

(b) detecting the tilt angle of the key fob;

(c) determining if a tilt angle function is disabled;

(d) determining if the detected tilt angle is within a predetermined range from horizontal; and (e) transmitting a signal indicative of a remote keyless entry function associated with the user operable button if the tilt angle function is disabled, or if the tilt angle function is not disabled and the detected tilt angle is within the predetermined range from the horizontal when the actuation of the user operable button is detected.

19. The method of claim 18 further including the steps of:

(f) determining if the remote keyless entry function of the user operable button is a preferred orientation function; and (g) transmitting the signal indicative of the remote keyless entry function if the remote keyless entry function is not a preferred orientation function regardless of the detected tilt angle.

20. The method of claim 18 wherein step (e) is further defined by the signal transmission being a radio frequency transmission.

* * * * *